Aug. 26, 1930.  P. C. GARDINER  1,774,433

REGULATION OF THE COLOR OF COOKED PRODUCTS

Filed March 24, 1927

Inventor:
Paul C. Gardiner,
by
His Attorney.

Patented Aug. 26, 1930

1,774,433

UNITED STATES PATENT OFFICE

PAUL C. GARDINER, OF SCHENECTADY, NEW YORK, ASSIGNOR TO GENERAL ELECTRIC COMPANY, A CORPORATION OF NEW YORK

REGULATION OF THE COLOR OF COOKED PRODUCTS

Application filed March 24, 1927. Serial No. 178,123.

The present invention relates to means for automatically maintaining a substantially constant color in manufactured products and more particularly to an arrangement for regulating the temperature of an oven so as to produce cooked articles which shall be uniform in color. Heretofore in the manufacture of food products, such as bread, breakfast foods and the like, attempts have been made to regulate the color of the cooked article by means of thermostats placed in an oven and arranged to maintain the heat of the oven substantially constant. With such an arrangement, however, it has been practically impossible to maintain a definite color in the cooked article. This difficulty has been due to different factors, one of which is the amount of moisture in the oven, the same temperature in the oven producing widely different colors in the cooked products in the presence of different degrees of moisture.

It is one of the objects of the present invention to provide means for automatically maintaining an oven at a temperature which will produce cooked articles substantially constant in color irrespective of varying conditions tending to produce changes in the color of the cooked product.

Figure 1:
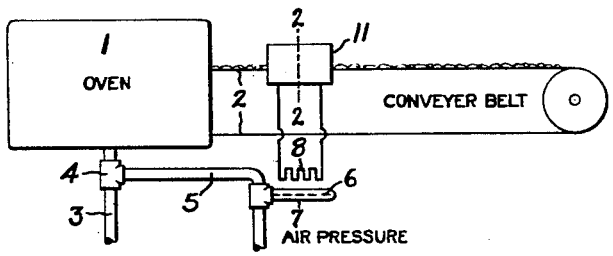
Figure 2:
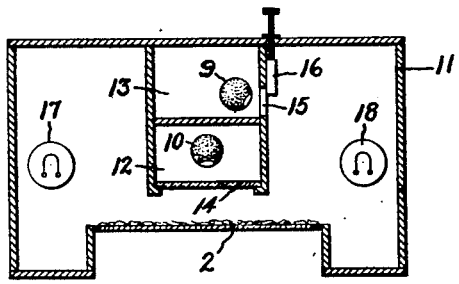
Figure 3:
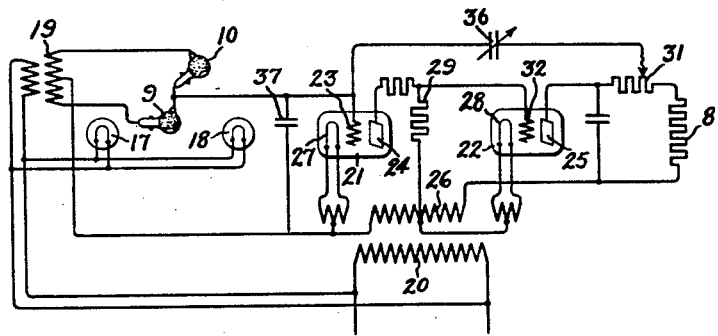
Figure 4:
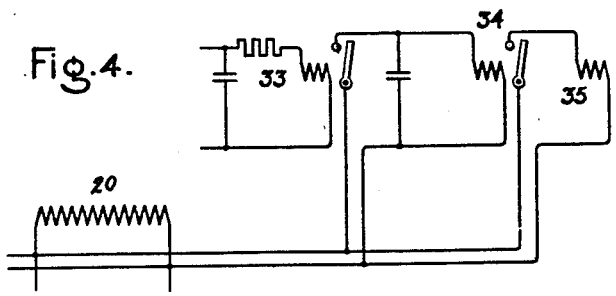

The novel features which I believe to be characteristic of my invention are set forth with particularity in the appended claims. My invention itself, however, will best be understood from reference to the following specification when considered in connection with the accompanying drawing in which Fig. 1 shows diagrammatically an arrangement embodying the features of my invention; Fig. 2 is a cross section taken on the line 2—2 of Fig. 1; Fig. 3 shows diagrammatically a circuit arrangement for carrying out my invention; while Fig. 4 is a modified form of circuit arrangement which may be employed in connection with the invention.

Referring to the drawing, I have indicated at 1 an oven adapted to cook any form of food product. An endless belt conveyor 2, associated with the oven, is adapted to receive cooked products thereon. The oven is heated by gas supplied from a gas pipe 3. A diaphragm valve 4 controlled by air pressure applied through a pipe 5 governs the supply of gas to the oven. The air pressure in pipe 5 is controlled by a thermostatic valve 6 mounted in a metal casing 7 and controlled by an electric heating element 8.

A pair of vacuum type photoelectric cells 9 and 10 are mounted in a casing 11 above the conveyor belt 2. The casing has two inner compartments 12 and 13 which contain respectively the photoelectric cells 10 and 9. The lower compartment 12 is provided with a glass window 14, while the upper compartment is provided with an opening 15, the extent of which may be varied by an adjustable closure member 16. Incandescent lamps 17 and 18 are so mounted in the casing 11 that light from the lamps is directed onto the cooked product on the conveyor belt 2, reflected therefrom and directed onto cell 10. Light from the lamp 18 alone is directed onto cell 9 through opening 15. When there is any variation in the color of the material on the conveyor belt 2 a corresponding variation is produced in the resistance of the light cell 10, and a corresponding change produced in the current flowing through the heater element 8.

A circuit whereby the variations of the light directed onto cell 10 may control the oven temperature, is shown diagrammatically in Fig. 3. In this figure photoelectric or light sensitive cells 9 and 10 are connected in series with a secondary transformer winding 19 which is energized from an alternating current source of energy 20. Lamps 17 and 18 cooperate with the light cells in a manner indicated in Fig. 2. A pair of electron discharge devices 21 and 22, each of which comprises an anode, cathode and grid or control electrode cooperating with the light sensitive cells, the control electrode 23 of the device 21 being connected to a point between the cathode and anode members respectively of the light sensitive cells 9 and 10.

Current is simultaneously supplied to the anode members 24 and 25 of the discharge devices from a secondary transformer winding 26 energized from the alternating current source 20. The filament 27 of the device 21 is connected to the mid-point of the secondary transformer winding 19, while the filament 28 is connected to the mid-point of winding 26. The anode member 24 is connected to the mid-point of winding 26 through a resistor 29, while the anode 25 of the discharge device 22 is connected to winding 26 through the heating resistor 8 and a resistor 31. A regenerative connection may, if desired, extend from the resistor 31 to the grid electrode 23.

In the operation of the system as disclosed in Fig. 3, light is normally directed on to both light sensitive cells 9 and 10 so that the resistance of the cells will be substantially equal. When an alternating electromotive force is supplied to winding 19 current will flow through both cells during one half of the alternating wave. Since the drops across both cells are substantially equal the grid or control electrode 23 will normally have a potential which is substantially that of the mid-point of winding 19. Since filament 27 is connected to this point, grid 23 will normally have substantially the same potential as its associated filament 27 and when anode 24 is positive, current will flow in the output circuit of tube 21.

Grid 32 of tube 22 can never go positive since it is separated from its own filament merely by a resistor 29 through which current can pass only in such a direction as to produce a negative potential on the grid. Grid 32 is, therefore, negative during the half cycle that current is flowing in the output circuit of tube 21, and this potential is proportional to the plate current of tube 21. During the half cycle that the grid 32 is negative the anode 25 will be positive and current will flow in the output circuit of tube 22 if the negative potential of the grid is not too great.

If, during operation, the light directed onto cell 10 increases owing to a change of color in the product on the conveyor the resistance of this cell will decrease from normal, and grid 23 will go negative from the filament. The increase in negative potential of grid 23 causes a decrease in the current flowing in the output circuit of tube 21 and a corresponding decrease in the negative potential of grid 32 thus allowing more current to flow through heater element 8 included in the output circuit of tube 22. Increase of current in the heater element 8 tends to close the valve 6 in the air pipe 5 and thereby increase the amount of gas supplied to the oven 1.

If the light directed onto cell 10 decreases, the reverse operation will take place. Grid 23 will become less negative and the decrease in negative potential causes an increase in the output current of cell 21 and an increase in the negative potential applied to grid 32. As a result the current flowing through the heater element 8 is decreased and the valve 6 opened and the supply of gas to the oven reduced.

If desired, the heater element 8 and the valve 6 may be dispensed with and valve 4 operated directly by a solenoid. In the latter case a solenoid coil 33 is substituted for resistor 8. Solenoid 33 controls a circuit for a relay 34 which is energized from the source of power 20. Relay 34 closes a circuit for coil 35 which controls the operation of valve 4.

A regenerative connection may be employed, if desired, with the circuits shown on the drawing. Such a connection is of considerable value in photoelectric circuits, since increased sensitivity and speed may be obtained by its use. For example, grid 23 in normal operation requires a considerable amount of current to change its capacity to ground and to filament 27 at a given voltage and at high speed. Since the photoelectric cells can supply only a certain current, the speed of operation is therefore limited, but by adding a connection from resistor 31 through a variable condenser 36 to grid 23 added current may be supplied to the grid 23 permitting greater speed of operation. The circuit indicated in Fig. 3 was found to give very effective regeneration at very slow as well as at audio frequency operation. The condenser 36 in this connection should have a capacity of sufficient value to compensate for the capacity of the grid lead to ground.

A condenser 37 may be connected between grid 23 and filament 21. This condenser, while not absolutely necessary, will be found to be advantageous if the filament 27 is not connected exactly to the center of transformer winding 19.

What I claim as new and desire to secure by Letters Patent of the United States, is,—

1. In combination, an oven, means for heating the oven to cook a product therein, and means responsive to the condition of the cooked product after being removed from the oven for controlling the temperature of the oven.

2. In combination, an oven, means for heating the oven to cook a product therein, and means responsive to variations in the color of the cooked product after being removed from the oven for controlling the temperature of the oven, whereby a product of substantially uniform color may be obtained.

3. In combination, an oven, means for heating the oven, and controlling means therefor, said controlling means comprising a pair of reversely connected light sensitive cells one of which is responsive to changes in the color of a product cooked in said oven and the other of which receives substantially constant illumination.

4. In combination, a manufactured product, means for maintaining the color of said product substantially constant, said means including an electrically operable device, and means responsive to changes in the color of the product for producing variations in the current in said device, said latter means comprising a pair of reversely connected light sensitive cells one of which receives substantially constant illumination and the other of which receives light reflected from the surface of said product.

5. In combination, an oven, means for heating the oven to cook a product therein, a light-sensitive cell associated with said oven and responsive to changes in the color of the cooked product after being removed from the oven, and means controlled by the variation of the current in said cell for controlling the heat of said oven.

6. In combination, a manufactured product, means for varying the color of said product, a light sensitive cell associated with said means and responsive to changes in the color of said product, and means controlled by variations in the current in said cell for automatically controlling said first mentioned means whereby a product of substantially uniform color may be obtained.

7. In combination, a manufactured product, means for automatically controlling the color of said product, said means comprising a circuit including a transformer winding and a pair of light sensitive cells, means whereby a substantially constant light may be directed on to one of said cells, and means whereby a variable light may be directed from said product on to the other of said cells, an electron discharge device comprising an anode, cathode and control electrode, a connection from the control electrode to said circuit, and means whereby an alternating electromotive force may be simultaneously supplied to said circuit and to the anode of said discharge device.

8. In combination, a manufactured product, means controlling the color of said product, a circuit including a pair of light sensitive cells, a pair of electron discharge devices each comprising an anode, cathode and control electrode, a connection from said circuit to the control electrode of one of said devices, a connection between said discharge devices, means for simultaneously supplying an electromotive force to said circuit and discharge devices, and means in the output circuit of one of said discharge devices for automatically controlling said first mentioned means.

9. In combination, a manufactured product, means controlling the color of said product, said means comprising a circuit including a pair of light sensitive cells, a pair of electric discharge devices each comprising an anode, cathode and control electrode, a connection from said circuit to the control electrode of one of the discharge devices, and a connection between said discharge devices whereby an increase in the current in the output circuit of said one discharge device causes a decrease in current in the output circuit of said other discharge device.

10. In combination, a circuit comprising a pair of light sensitive cells, an electric discharge device comprising an anode, cathode and control electrode, a connection from said circuit to said control electrode, a second electric discharge device comprising an anode, cathode and control electrode, a connection from the control electrode of said second device to the anode of said first device, a connection between the output circuit of the second device and the control electrode of the first device, and means whereby an electromotive force may be simultaneously supplied to said circuit and to the anodes of said discharge devices.

11. In combination, a circuit comprising a transformer winding and a pair of light sensitive cells, an electric discharge device comprising an anode, cathode and control electrode, a connection from said circuit to said control electrode, a second electric discharge device comprising an anode, cathode and control electrode, a connection from the control electrode of said second device to the anode of said first device, a connection between the output circuit of the second device and the control electrode of the first device, and means whereby an alternating electromotive force may be simultaneously supplied to said transformer winding and to the anodes of said discharge devices.

12. In combination, an oven, a conveyor extending into said oven and adapted to remove material therefrom, and means mounted adjacent the conveyor and responsive to the condition of the material thereon for controlling the temperature of the oven.

13. In combination, an oven, a conveyor extending into said oven and adapted to remove material therefrom, and means mounted adjacent to the conveyor and responsive to variations in the color of the material thereon for controlling the temperature of the oven, said means comprising a pair of reversely connected light sensitive cells.

In witness whereof, I have hereunto set my hand this 23d day of March, 1927.

PAUL C. GARDINER.